Jan. 31, 1961 S. A. CORREN 2,970,181
BATTERY SEPARATOR AND METHOD OF FORMING SAME
Filed Oct. 12, 1959

INVENTOR.
SIDNEY A. CORREN
BY
Leonard H. King

United States Patent Office 2,970,181
Patented Jan. 31, 1961

2,970,181

BATTERY SEPARATOR AND METHOD OF FORMING SAME

Sidney A. Corren, 163 Cherry St., Katonah, N.Y.

Filed Oct. 12, 1959, Ser. No. 845,922

12 Claims. (Cl. 136—143)

This invention relates to a low cost battery separator for batteries employing composition type electrodes containing synthetic resin as a binder for the electrochemical constituents, and the method of forming same.

Briefly stated, this invention comprises forming a battery separator by a simple and inexpensive process wherein a synthetic resin monofilament is formed into a planar serpentine arrangement by means of a jig. The filament is wet with an adhesive and then a pair of electrodes of unlike polarity is positioned on either side of the monofilament. The electrodes are maintained under pressure until the filament adheres to the electrode. Thereafter the excess monofilament is trimmed away so that the resulting structure comprises a pair of electrodes spaced from each other by a plurality of monofilament lengths interposed between them.

The arrangement disclosed herein is much preferred to wrapping a monofilament spirally around the electrode. If a spiral wrapping is too loose, the separator will be loose and tend to move, consuming a greater plate area and possibly creating areas inadequately wet with electrolyte. On the other hand, if the monofilament be tightly wound in spiral fashion about the electrode, it is apt to bend, warp or cut the electrode.

The invention will be disclosed more fully hereinafter in conjunction with the accompanying drawings.

Positive electrode 6 and negative electrode 8 are spaced from each other by a plurality of monofilaments 10. The monofilament may be of nylon having a diameter ranging from 0.005″ to 0.025″ and spaced from 0.06″ to 0.25″ apart. The spacing and the diameter of the filament will depend on the characteristics of the electrode. An electrode of smooth configuration and formed of a coherent material may utilize as a spacer a fine diameter monofilament. An electrode characterized by a coarse surface or flaking of active battery material would accordingly require a heavier diameter monofilament. The spacing would likewise depend on the rigidity of the electrode employed. A flexible electrode would require a monofilament of greater diameter and spaced more closely than a rigid electrode.

Figure 1:
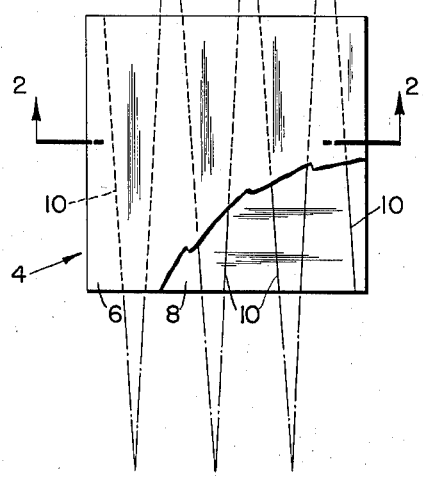
Figure 1 is a plan view, shown partially broken away, of a typical area of an electrode assembly made in accordance with this invention.
Figure 2:
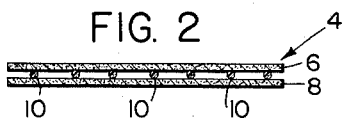
Figure 2 is a cross-sectional view taken along lines 2—2 of Figure 1.
Figure 3:
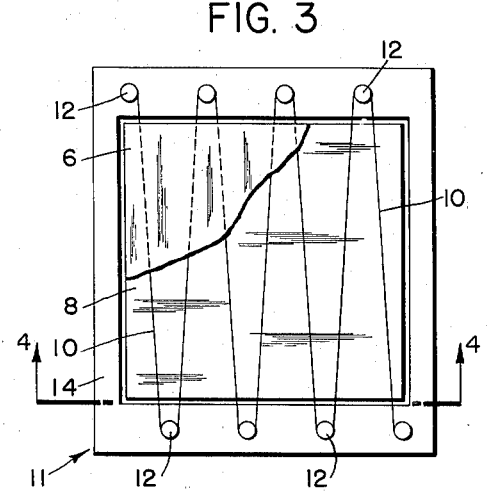
Figure 3 shows in plan, partially broken away, a jig, for positioning a monofilament, together with a pair of electrodes in juxtaposition, one of said electrodes being shown partially cut away so as to expose a portion of a monofilament and the other of the electrodes.

In Figure 3 there is shown a jig 11 which includes a frame 14. The frame is provided with a plurality of pins 12 in two spaced rows. The monofilament 10 is wound back and forth between the two rows to form a series of spaced paths over the area defined by the frame 14. The monofilament is secured in a taut position by fastening the ends thereof to the end pins of the jig.

In a subsequent step the filament is coated with an adhesive. A particularly well suited adhesive has been found to be a solution of polyvinyl chloride-polyvinyl acetate copolymer in the proportions of 80:20 parts by weight dissolved in methyl ethyl ketone. The copolymer is obtained by the copolymerization of the respective monomers. Mixtures obtained by the blending of the two polymers may likewise be employed. The electrodes are then assembled in juxtaposition with the stretched filament as shown in Figure 3.

Figure 4:
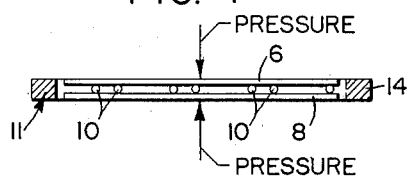
Figure 4 shows in elevation a section taken along line 4—4 of Figure 3 with pressure applied, shown diagrammatically, during a bonding operation.

In Figure 4 there are shown the assembly of electrodes and the filament stretched in frame 11, the assembly is maintained under pressure until bonding is complete. A conventional hydraulic press is suitable for this purpose.

Monofilaments having suitable properties may readily be determined by reference to the published literature. For example the "1955 Modern Plastics Encyclopedia issue," at pages 856–861, contains a table entitled "Fibers Chart."

From the chart it may be determined which fibers are resistant to chemical attack or swelling in the electrolyte of the electrochemical system in which the monofilament is to be employed and would therefore be suitable for this application.

By way of illustration and without intending to be limiting, suitable materials for use with alkaline battery systems include polyethylene, vinyl chloride-vinyl acetate, nylon, polytetrafluorethylene, polyesters such as Dacron, porous polyvinyl chloride, polyacylonitrile and acrylics, typical of which are Dynel, Orlon and Acrilan.

Having thus disclosed my invention, what is claimed is:

1. The method of forming a separator for a pair of battery electrodes employing composition type electrodes containing synthetic resin as a binder for the electrochemical constituents, comprising the steps of forming a continuous synthetic resin monofilament into a planar serpentine winding comprising a series of interconnected reversing loops, positioning said electrodes on opposite sides of said serpentine winding in the presence of an adhesive, with said loops outwardly extending from said electrodes, compressing said electrodes and said monofilament so as to bond said electrodes and said monofilament together, and removing said loops.

2. The method of claim 1 wherein said synthetic resin is nylon.

3. The method of claim 1 wherein said synthetic resin is polyethylene.

4. The method of claim 1 wherein said synthetic resin is polytetrafluorethylene.

5. The method of claim 1 wherein said synthetic resin is a polyester.

6. The method of claim 1 wherein said synthetic resin is an acrylic.

7. A battery electrode assembly, employing composition type electrodes containing a synthetic resin as a binder for the electrochemical constituents, comprising a pair of said electrodes of opposite polarity separated by a plurality of synthetic resin monofilament members bonded to said electrodes, wherein said monofilament members are spaced from 0.06″ to 0.25″ apart and have a diameter in the range of from 0.005″ to 0.025″ and are oriented in a single plane with each of said members lying on a line whereby the line of said member intersects the line of the next adjacent member at a point outside said electrode assembly.

8. The battery electrode assembly of claim 7 wherein said synthetic resin is nylon.

9. The battery electrode assembly of claim 7 wherein said synthetic resin is polyethylene.

10. The battery electrode assembly of claim 7 wherein said synthetic resin is polytetrafluorethylene.

11. The battery electrode assembly of claim 7 wherein said synthetic resin is a polyester.

12. The battery electrode assembly of claim 7 wherein said synthetic resin is an acrylic.

References Cited in the file of this patent

UNITED STATES PATENTS

| | | |
|---|---|---|
| 1,506,391 | Sturges | Aug. 26, 1924 |
| 1,506,392 | Sturges | Aug. 26, 1924 |
| 1,804,916 | Cotte | May 12, 1931 |
| 2,423,196 | MacKendrick | July 1, 1947 |